United States Patent [19]

Kashiwabara et al.

[11] Patent Number: 5,325,946
[45] Date of Patent: Jul. 5, 1994

[54] CONTROL DEVICE AND CONTROL METHOD FOR AUTOMATIC TRANSMISSION FOR VEHICLE

[75] Inventors: Masuo Kashiwabara; Akira Shimizu, both of Isesaki, Japan

[73] Assignee: Japan Electronic Control Systems Co., Ltd., Isesaki, Japan

[21] Appl. No.: 956,852

[22] Filed: Oct. 2, 1992

[30] Foreign Application Priority Data

Oct. 2, 1991 [JP] Japan .................... 3-080174[U]

[51] Int. Cl.⁵ .............................................. F16D 33/00
[52] U.S. Cl. ..................... 192/3.31; 192/3.29; 192/103 F; 477/65; 477/168
[58] Field of Search .................... 192/3.31, 3.29, 0.033, 192/0.076, 0.075, 103 F

[56] References Cited

U.S. PATENT DOCUMENTS

| | | | |
|---|---|---|---|
| 4,640,394 | 2/1987 | Higashi et al. ................ | 192/3.31 X |
| 5,010,990 | 4/1991 | Yoshimura et al. ............. | 192/3.3 |
| 5,115,896 | 5/1992 | Noguchi et al. ............... | 192/0.076 X |
| 5,152,386 | 10/1992 | Imamura ...................... | 192/0.075 |
| 5,219,055 | 6/1993 | Imamura ...................... | 192/0.075 |

FOREIGN PATENT DOCUMENTS 62-115556  7/1987  Japan .

*Primary Examiner*—Leslie A. Braun
*Assistant Examiner*—Andrea Pitts
*Attorney, Agent, or Firm*—Foley & Lardner

[57] ABSTRACT

In a driving zone where a torque converter is to be locked up, a lockup force of a lockup clutch is weakened in the deceleration driving state compared with that in the non-deceleration driving state. Moreover, during transition from the deceleration driving state to the non-deceleration driving state, increase control of the lockup force is forcedly delayed for a predetermined time. By this, during acceleration from the deceleration driving state, the clutch is made to slip with a rapid increase in engine output torque and a rise in the engine output torque is buffered by the lockup clutch.

18 Claims, 7 Drawing Sheets

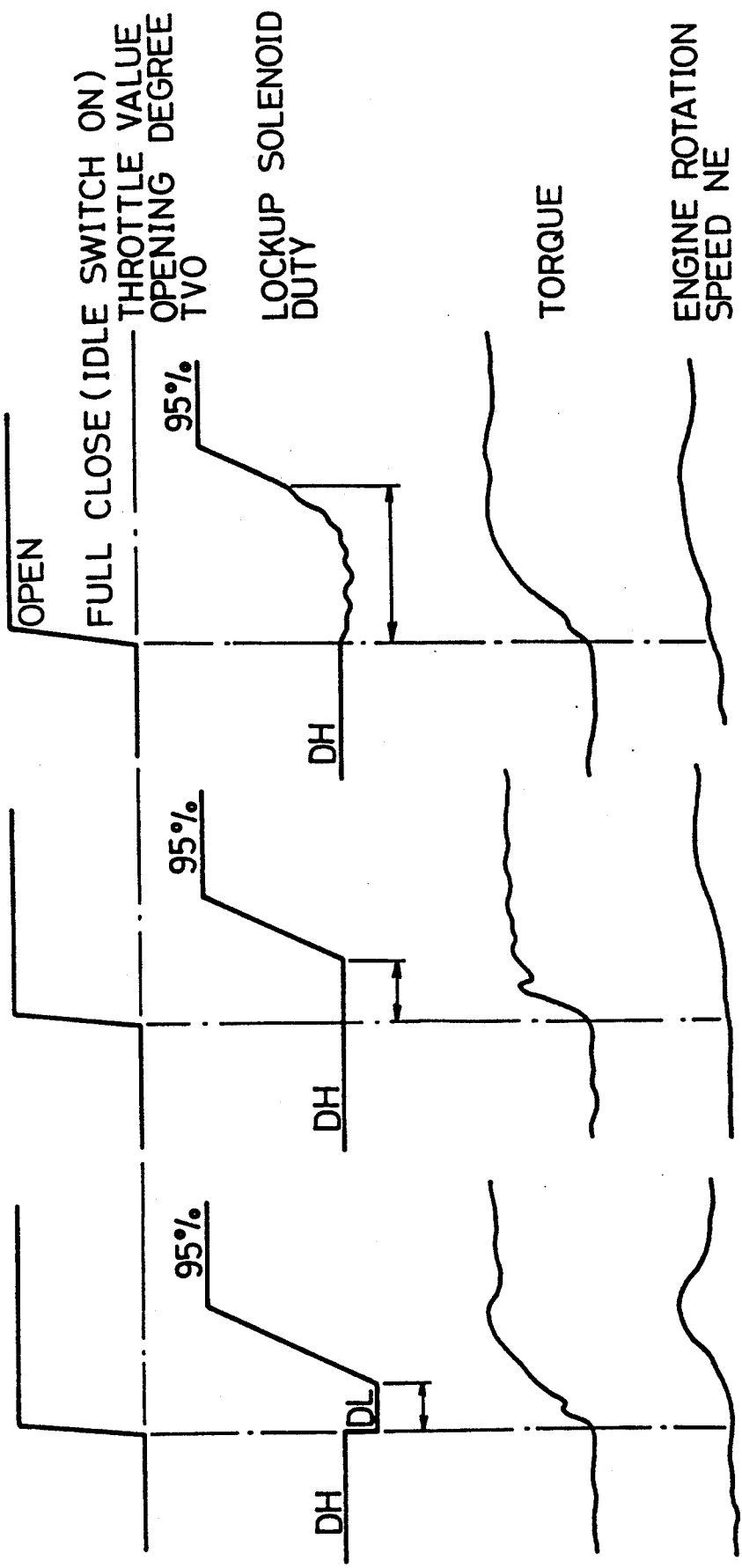

CONTROL DEVICE AND CONTROL METHOD FOR AUTOMATIC TRANSMISSION FOR VEHICLE

BACKGROUND OF THE INVENTION

1. Field of the Invention

The present invention relates a control device for an automatic transmission for a vehicle and particularly to a method, in an automatic transmission for a vehicle provided with a torque converter between an output shaft of an engine and an input shaft of a gear type transmission and provided with a lockup clutch for mechanically and directly engaging an input shaft with an output shaft of the above torque converter, for controlling a lockup force of the above lockup clutch and more particularly to an improvement in lockup force control during acceleration from a deceleration driving zone.

2. Description of the Related Art

It is well known that transmission efficiency of a torque converter is improved by providing a hydraulic lockup clutch that can mechanically and directly engage an input shaft with an output shaft of a torque converter therein and by locking the above lockup clutch in a conventional automatic transmission for a vehicle.

Also, by locking this lockup clutch during deceleration so as to restrain rapid lowering of engine rotation by transmitting a reverse driving force from the driving wheel side to the engine side, a fuel supply stop control is carried out for a long time during deceleration driving so as to improve fuel consumption (See Japanese Unexamined Utility Model Publication No. 62-115556).

In the meantime, when lockup control is executed during deceleration driving and particularly when an accel pedal is depressed the low car-speed side in a deceleration driving zone where vehicle speed or engine rotation speed is more than a predetermined value and the engine is in the non-load state, rapid fluctuation in engine output torque is transmitted to the wheels through the lockup clutch, which imports unpleasant vibration to passengers in the vehicle. Thus, there is the problem that the set vehicle speed at which the lockup control is to be executed cannot be significantly lowered.

The applicant then considered lowering the lockup force of a lockup clutch in a deceleration driving zone more than that in a non-deceleration driving zone so as to buffer a rapid rise in the engine output torque during acceleration from the deceleration driving state by the above lockup force, which was lowered in advance.

In order to favorably buffer the above rapid increase in torque with the torque converter, it is only necessary to substantially reduce the lockup force of the lockup clutch in the deceleration driving state. However, when the lockup force during deceleration driving is lowered excessively, the object of increasing the transmission efficiency during deceleration driving could not be fully attained, and even if the lockup force during deceleration driving is fully lowered, the lockup force was immediately increased to a level corresponding to non-deceleration driving and a rise in torque could not be favorably absorbed, which may impart an unpleasant vibration to passengers.

SUMMARY OF THE INVENTION

The present invention was made in view of the aforementioned problems, and the object is to provide a control device and a method for an automatic transmission for a vehicle that does not experience deterioration in driving performance and improves fuel consumption by executing a lockup control until the low car-speed side of a deceleration driving zone and favorably prevents generation of vibration during acceleration from the deceleration driving state.

Another object of the present invention is to provide a control device with a simple structure and a method for an automatic transmission that can achieve the above object.

Another object of the present invention is to provide a control device and a method for an automatic transmission that can stably prevent generation of vibration during the above acceleration by controlling the lockup force during the above acceleration with high accuracy.

In order to achieve the above objects a control device and a method for an automatic transmission for a vehicle according to the present invention is so constituted that a torque converter is placed between an output shaft of an engine and an input shaft of a gear type transmission; a lockup clutch for mechanically and directly engaging an input shaft with an output shaft of the above torque converter is provided; a lockup force of the lockup clutch is switched and controlled so that the lockup force in the deceleration driving state of the engine is smaller than the lockup force in the non-deceleration driving state, and an increase in the lockup force of the lockup clutch is forcedly delayed during the transition from the deceleration driving state to the non-deceleration driving state.

With such a constitution, in the non-deceleration driving zone, the lockup force of the lockup clutch is weaker than that during the deceleration driving, and moreover, even after transition to the non-deceleration driving, as an increase in the lockup force is forcedly delayed, a rapid rise in the engine output torque can be buffered by a slip of the lockup clutch.

Also, even in the deceleration driving zone, direct engagement by the lockup clutch can prevent rapid lowering of engine rotation during deceleration driving.

As the above lockup force is made further smaller than the lockup force in the deceleration driving state for a predetermined time at the beginning of the transition from the deceleration driving state to the non-deceleration driving state, a rise in the lockup force during the transition to the above non-deceleration driving state can be forcedly delayed.

With such a constitution, in the deceleration driving state, by leaving the lockup clutch in the direct engagement state with a relatively weak lockup force in the deceleration driving state, and by further weakening the lockup force during the transition to the non-deceleration driving state, slipping of the lockup clutch can be induced by a rise in the torque and a buffer action can be generated.

Also, during the transition from the deceleration driving state to the non-deceleration driving state, the transition from the lockup force corresponding to the deceleration driving state to the lockup force corresponding to the non-deceleration driving state may be forced for a predetermined time, and in this case, if the lockup force in the deceleration driving state is set at a small level, the lockup clutch can be made to slip so as to buffer a rise in the torque.

Moreover, the lockup force may be forcedly feedback controlled so that a difference between rotation speed of the input and output shafts of the torque converter becomes constant for a predetermined time at the beginning of the transition from the deceleration driving state to the non-deceleration driving state.

With such a constitution, as the slip state of the lockup clutch can be controlled with high accuracy, a rise in the torque can be stably buffered by controlling the slip state so as to be constant during the transition to the non-deceleration driving.

The rotation speed of the input shaft of the above torque converter can be detected as a rotation speed of the engine, and the rotation speed of the output shaft of the torque converter can be detected based on the driving speed of the vehicle and the gear ratio of the above gear type transmission.

With the above constitution, engine rotation speed information detected generally for engine control and general vehicle driving speed information as information for automatic transmission control can be used, which eliminates the need for a sensor for directly detecting the rotation speed of the output of the torque converter.

Also, it is preferable that the lockup clutch is a hydraulic clutch whose lockup force is regulated according to supply hydraulic pressure and its lockup force is regulated according to the duty ratio of opening/closing control of a valve for regulating the above supply hydraulic pressure.

With such a constitution, as the lockup force is controlled according to the above duty ratio, the lockup force can be switched by setting in advance the duty ratio corresponding to the deceleration driving state and the non-deceleration driving state.

Moreover, it is preferable that the lockup force of the lockup clutch in the deceleration driving state is set as the minimum lockup force that can keep the direct engagement state of the lockup clutch.

During transition from the deceleration driving state to the non-deceleration driving state, it is preferable to weaken the lockup force, but if the control to weaken the lockup force is executed after the above transition is detected, response will be delayed. Then in the deceleration driving state, the lockup force is weakened in advance in preparation for the transition to the non-deceleration driving. However, as the lockup force at the above deceleration driving is the minimum lockup force that can keep the direct engagement state of the lockup clutch, the reverse driving force from the driving wheel side can be transmitted to the engine during deceleration driving, whereby lowering of the engine rotation during the deceleration driving can be restrained.

Also, it is preferable that an idle position of a throttle valve provided at an intake air system of the engine is determined as the deceleration driving state of the engine, the constitution of which enables simple detection of deceleration driving.

Also, it is preferable that the driving zone where the above lockup clutch is to be locked is determined by an opening degree of the throttle valve provided at the intake air system of the engine and the driving speed of the vehicle.

The objects of the present invention will be made obvious by the following description of a preferred embodiment by referring to the attached drawings.

BRIEF DESCRIPTION OF THE DRAWINGS

FIGS. 8($a$), 8($b$) and 8($c$) are time charts showing control characteristics in each of the preferred embodiment.

DESCRIPTION OF THE PREFERRED EMBODIMENT

Preferred embodiment of a control device and a control method for an automatic transmission for a vehicle according to the present invention are shown in FIGS. 1 to 8$c$.

Figure 2:
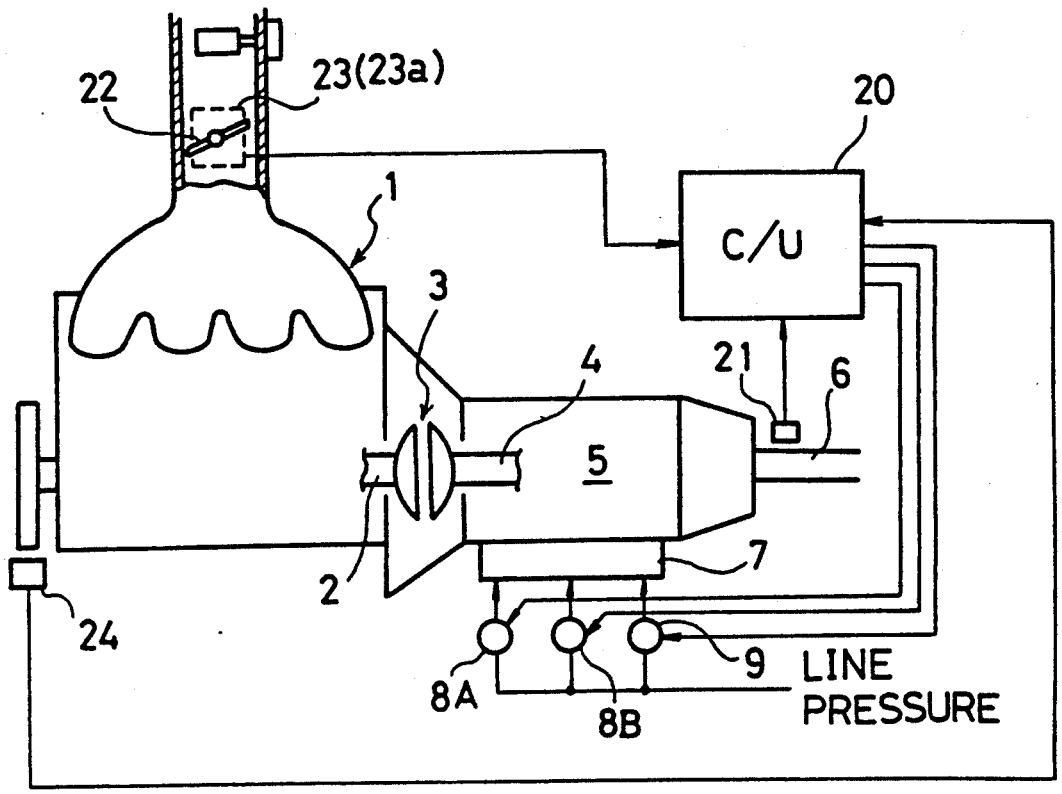
FIG. 2 is a schematic system diagram showing a preferred embodiment of the present invention.

FIG. 2 shows a system constitution of the preferred embodiment, wherein an automatic transmission is provided on the output side of an engine 1. The above automatic transmission is provided with a torque converter 3, into which rotation of an output shaft 2 of the engine 1 is put, and a gear type transmission 5 whose input shaft 4 is connected to the output side of the torque converter 3. 6 is an output shaft of the gear type transmission 5.

Figure 3:
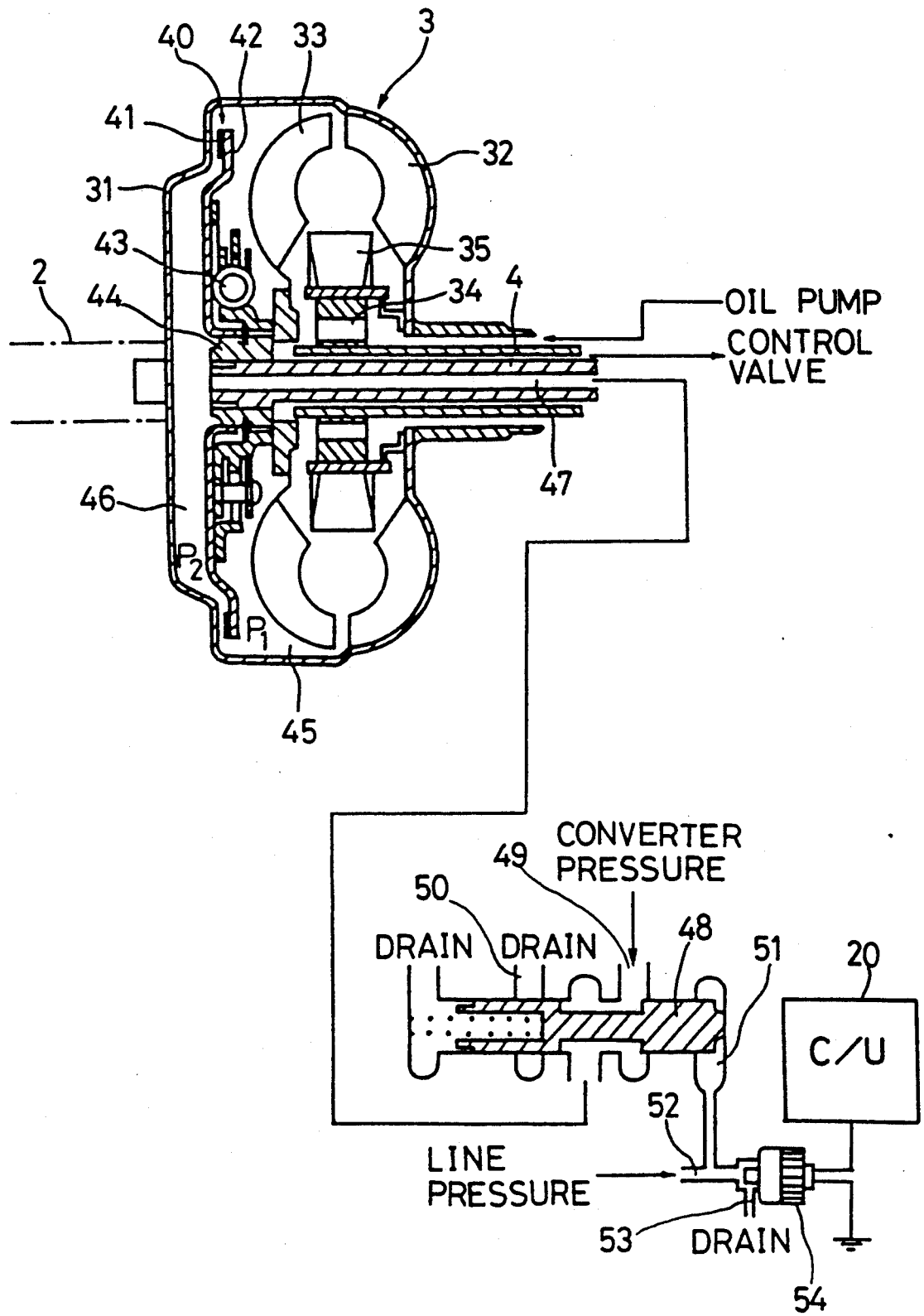
FIG. 3 is a sectional view showing a lockup clutch.

The torque converter 3 comprises, as shown in FIG. 3, a case 31 fixed and rotated by the engine output shaft 2, a pump impeller 32 mounted on the case 31, a turbine liner 33 mounted on the transmission input shaft 4 and a stator 35 supported through a one-way clutch 34, and the turbine liner 33 is rotated by a force of oil flowing from the pump impeller 32 to the turbine liner 33 by rotation of the pump impeller 32, and the oil going out of the turbine liner 33 is flown by the stator 35 in the direction not interrupting rotation of the pump impeller 32 to the pump impeller 32, whereby power is transmitted.

This torque converter 3 is provided with a lockup clutch 40 for mechanically engaging the input shaft with the output shaft of the torque converter 3 in a predetermined driving zone.

The lockup clutch 40 comprises a lockup plate 42 having a clutch facing 41 opposed to the inner wall of the case 31. The lockup plate 42 is integral with a torsion damper 43, and the torsion damper 43 is fixed to a clutch hub 44. The clutch hub 44 is spline-engaged with the transmission input shaft 4. Thus, the lockup plate is movable in the axial direction and is moved according to pressure P1 and P2 of pressure chambers 45 and 46 on both sides in the axial direction of the lockup plate 42.

The pressure P1 of the pressure chamber 45 is converter pressure and is almost constant. An oil passage 47 communicating to the pressure chamber 46 is connected to a converter pressure introducing passage 49 and drain passage 50 through a lockup control valve 48, and in the state where the lockup control valve 48 is moved in the right direction in the drawing, the oil passage 47 communicates with the converter pressure introducing passage 49, which results in P1<P2, and the lockup plate 42 is moved in the right direction in the drawing into the normal state (non-lockup state) separated from the inner wall of the case 31. On the other hand, in the state where the lockup control valve 48 is moved in the left direction in the drawing, the oil passage 47 communicates with the drain passage 50, which results in P2<P1, and the lockup plate 42 is moved in the left direction in the drawing and brought into contact with the inner wall of the case 31 into the lockup state. And in this lockup state, rotation of the case 31 by the engine output shaft 2 is transmitted to the transmission input shaft 4 through the lockup plate 42.

A pressure operating chamber 51 is provided on the end surface of the lockup control valve 48, and a line pressure introducing passage 52 is connected to this pressure operating chamber 51. In the middle of the line pressure introducing passage 52, a drain passage 53 diverging from it is provided, and a lockup solenoid 54 is provided at this drain passage 53.

With such constitution, the lockup clutch 40 is locked up or released through the lockup control valve 48 by duty control of the lockup solenoid 54 by a control unit, which will be described later.

That is, by reducing the duty ratio (ON time proportion) to the lockup solenoid 54 so as to open the drain passage 53 and by lowering the pressure working on the lockup control valve 48 from the pressure operating chamber 51, the lockup control valve 48 is moved in the right direction in the drawing and attains the non-lockup state, while by increasing the duty ratio (lockup force control value) to the lockup solenoid 54 so as to interrupt the drain passage 53 and by increasing pressure working on the lockup control valve 48 from the pressure operating chamber 51, the lockup control valve 48 is moved in the left direction in the drawing and attains the lockup state.

By referring back to FIG. 2, the gear type transmission 5 is provided with a hydraulic actuator 7 for engaging and releasing various friction elements inside. Working hydraulic pressure to this hydraulic actuator 7 is controlled through various solenoids, of which only solenoids 8A and 8B for shift and an overrun clutch solenoid 9 are shown.

The control unit 20 has a built-in micro-computer to which signals are sent from various sensors.

As the above various sensors, for example, a vehicle speed sensor 21 for sending out a pulse signal per certain rotation of the output shaft 6 of the gear type transmission 5 is provided for detecting vehicle speed VSP.

Also, a potentiometer type throttle sensor 23 is provided for detecting an opening degree TVO of the throttle valve 22 in the intake air system of the engine 1. An idle switch 23a which is turned on at an idle position (full-closed position) of the throttle valve 22 is provided at the above throttle sensor 23.

Moreover, a crank angle sensor 24 for sending out a pulse signal per certain rotation of a crank shaft is provided at the crank shaft of the engine 1 or a shaft rotated synchronously with the crank shaft. An engine rotation speed Ne can be detected by measuring a generating cycle of a pulse signal sent out from the above crank angle sensor 24 or the number of pulse signals generated in a predetermined time.

Here, the control unit 20 carries out transmission control according to the operating position of a select lever (not shown), and particularly when the select level is at the "Drive" range, a transmission position of the first to the fourth speed is automatically set according to the vehicle speed VSP and the throttle valve opening degree TVO, a combination of On and Off of the solenoids 8A and 8B for a shift is controlled and the gear type transmission 5 is controlled to that transmission position through the hydraulic actuator 7.

Figure 5:
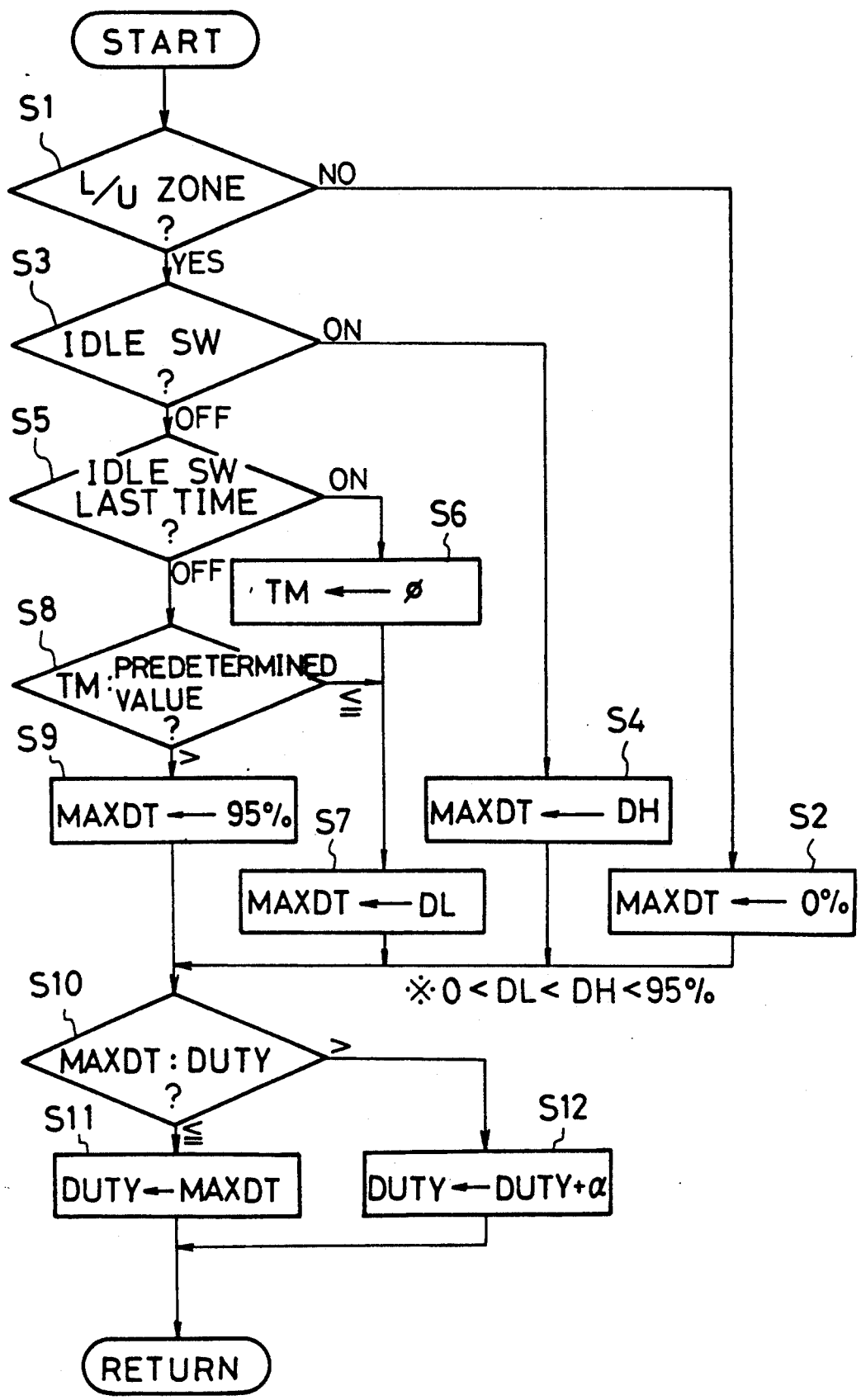
FIG. 5 is a flowchart showing a lockup control of a first preferred embodiment.
Figure 6:
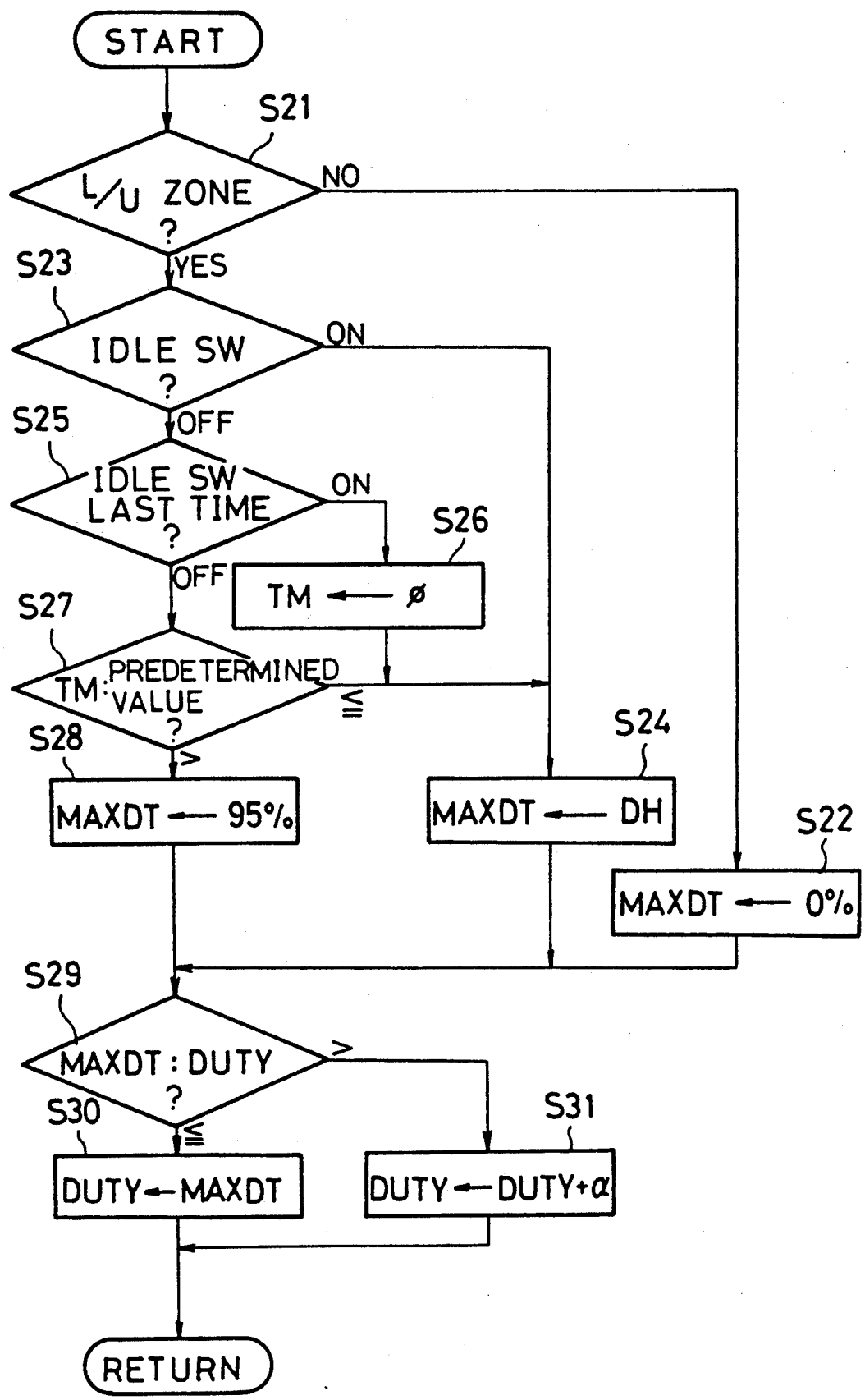
FIG. 6 is a flowchart showing a lockup control of a second preferred embodiment.
Figure 7:
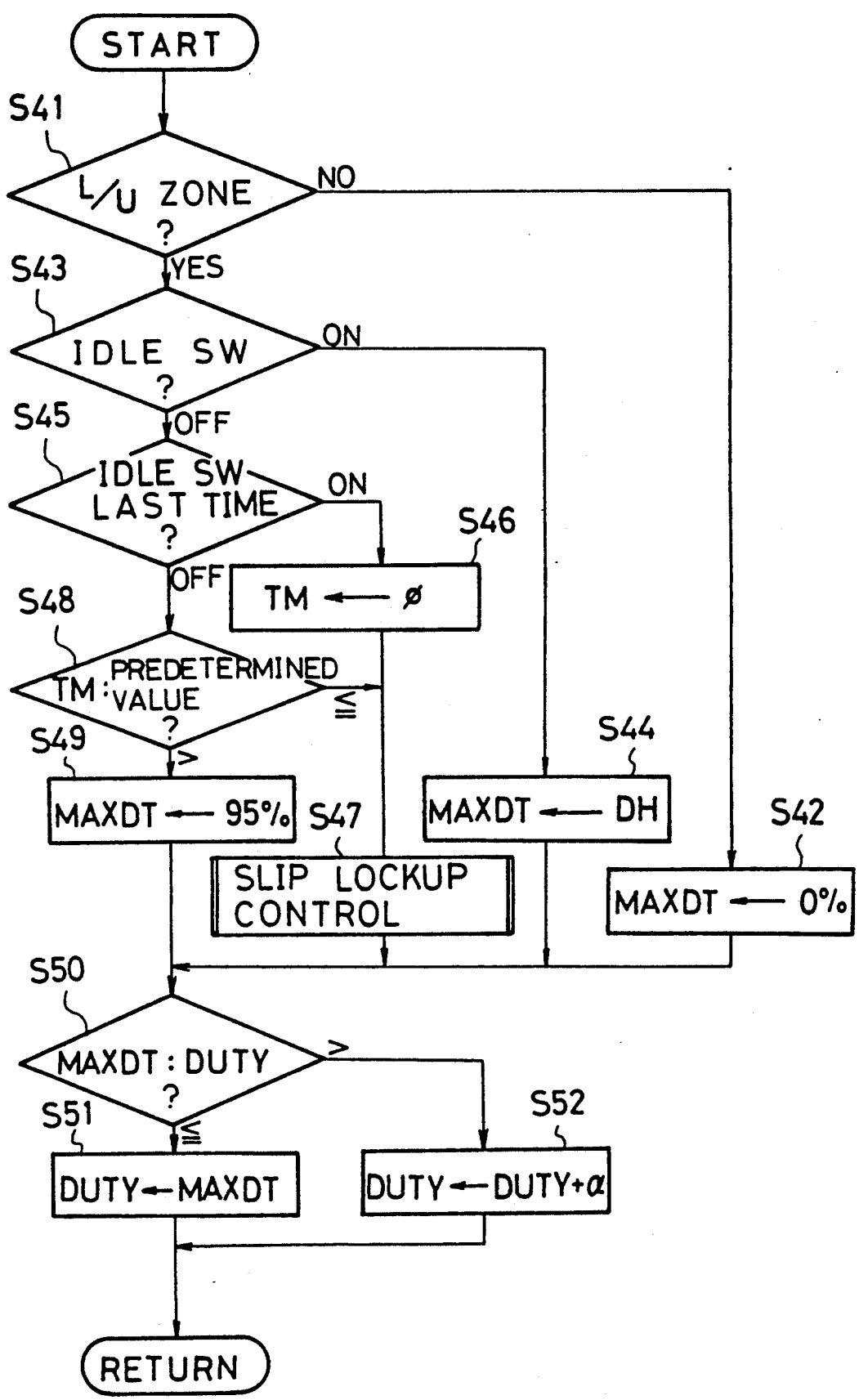
FIG. 7 is a flowchart showing a lockup control of a third preferred embodiment.

Also, the control unit 20 having a function as an engagement control means and a lockup force increase restraining means (See FIG. 1), sets the duty ratio DUTY (lockup force control value) to be sent to the lockup solenoid 54 according to a program shown in either one of the flowcharts in FIG. 5 to FIG. 7, puts out the above duty ratio DUTY to the lockup solenoid 54 and executes the lockup control.

Figure 4:
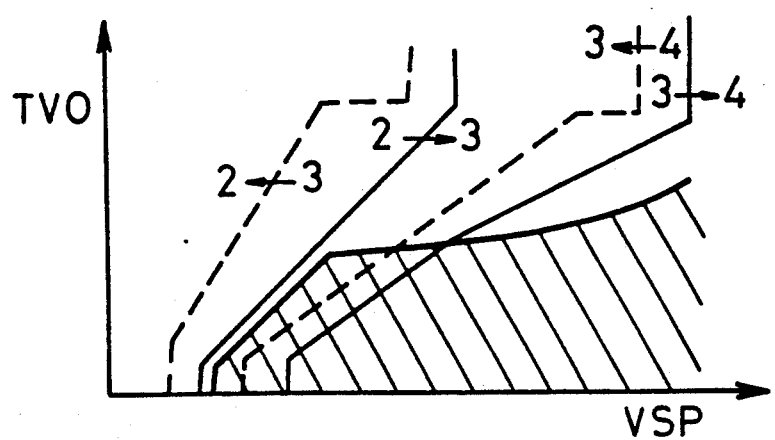
FIG. 4 is a diagram showing a lockup zone in the preferred embodiment.

In the flowchart in FIG. 5 the contents of the lockup control in the first preferred embodiment are shown. At Step 1 (S1 in the drawing. The same applies to the rest), it is determined whether the current driving condition is a predetermined driving zone where the lockup clutch 40 should be locked up. In this preferred embodiment, as shown in FIG. 4, an intermediate-to-high speed and low-load zone segmented by the vehicle speed VSP and the throttle valve opening degree TVO is set as a zone to carry out the lockup control, and it is determined whether it is the lock up (L/U) zone or not based on the vehicle speed VSP and the throttle valve opening degree TVO.

If judged not to be the lockup zone, it goes to Step 2, wherein 0% is set for the maximum value MAXDT of the duty ratio DUTY of a driving pulse signal to be sent to the lockup solenoid 54.

In the meantime, if determined to be the lockup zone at Step 1, it goes to Step 3, wherein it is determined whether the idle switch 23a is on or off.

When the idle switch 23a is on, it indicates a driving state in the deceleration driving zone with no engine load and a relatively high vehicle speed within the predetermined driving zone so as to carry out lockup, and it goes to Step 4, wherein a predetermined value DH lower than the above 95% is set for the above maximum value MAXDT.

The above predetermined value DH is set in advance at the minimum lockup force, which can eliminate a difference in rotation of the input and the output shafts of the torque converter so that transmission efficiency can be ensured while also restraining generation of shock caused by a rise in torque during acceleration from the above deceleration driving state (when the throttle valve is opened), that is, at the minimum lockup force that can keep the direct engagement state of the clutch. For example, if the duty ratio DUTY is above 50% and the clutch can be directly engaged, the above predetermined value DH is set at a value close to this 50%. The part of the above Step 4 corresponds to the control value switching means in this preferred embodiment (See FIG. 1).

Also, if the idle switch 23a is judged to be off at Step 3, it corresponds to the non-deceleration driving zone within the lockup zone, and it goes to Step 5, wherein it is determined whether the idle switch 23a was On or Off during the last execution of this program.

Figure 1:
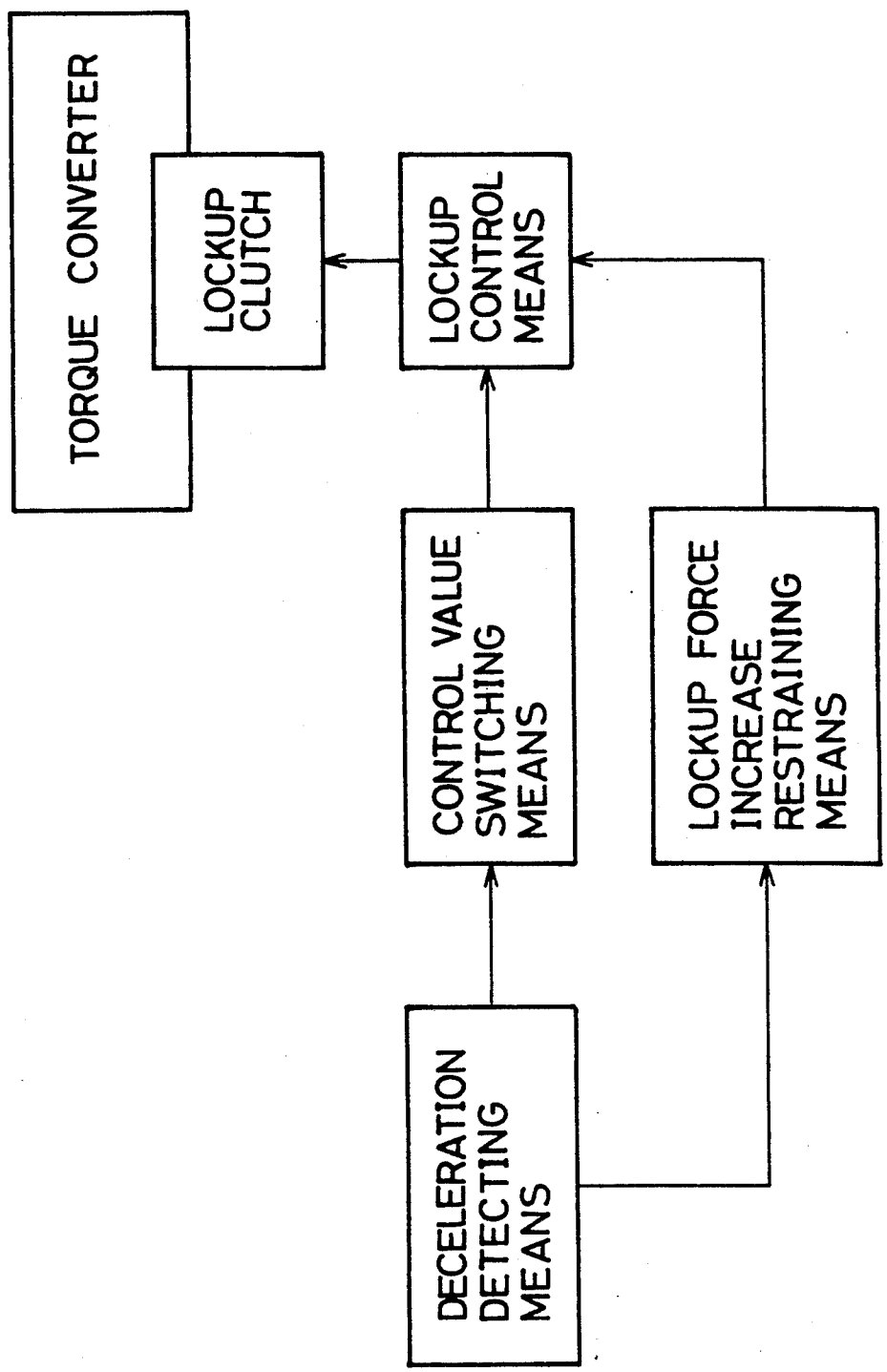
FIG. 1 is a block diagram showing a basic constitution of the present invention.

As mentioned above in this preferred embodiment, the lockup zone includes both the zone with the idle switch 23a being On and the zone with it being Off, and when the idle switch 23a is On, it is considered the deceleration driving state, and when the idle switch 23a is Off, it is considered the non-deceleration driving state, and the idle switch 23a corresponds to the deceleration detecting means (See FIG. 1).

When the idle switch 23a was On the last time, it is the first time that the throttle valve 22 is opened from the deceleration driving state and the idle switch 23a is switched from On to Off, that is, the first acceleration in the predetermined driving zone to carry out the lockup control shifted from the deceleration driving zone to the non-deceleration driving state, and it goes to Step 6 in this case.

At step 6, a timer TM for measuring the time passed from On to Off of the idle switch 23a is rest at zero. And at the next Step 7, a predetermined value DL slightly smaller than the above predetermined value DH is set for the above maximum value MAXDT. This part of Step 5 to Step 8 corresponds to the lockup force increase restraining means in this preferred embodiment (See FIG. 1).

In the meantime, if it is determined that the idle switch 23a was Off the last time as well at Step 5, it goes to Step 8, wherein the timer TM, which was reset at zero at switching of the idle switch 23a from On to Off is compared with the predetermined value, and unless the timer TM exceeds the predetermined value, it goes to Step 7, wherein the predetermined value DH is continuously set for the above maximum value MAXDT.

And when the timer TM exceeds the predetermined value, it goes from Step 8 to Step 9, wherein 95% is set for the above maximum value MAXDT corresponding to the non-deceleration driving zone in the lockup zone. When having entered the non-deceleration driving zone of the lockup zone from a non-lockup zone, as the timer TM has never been reset at zero, it goes Step 3-Step 5-Step 8-Step 9, and 95% is set for the above maximum value MAXDT.

As mentioned above, when the maximum value MAXDT is set, a current value of the duty ratio DUTY to be sent to the lockup solenoid 54 is compared with the above maximum value MAXDT at Step 10. And when the duty ratio DUTY is larger than the maximum value MAXDT, it goes to Step 11, wherein the maximum value MAXDT is set for the duty ratio DUTY, and when the duty ratio DUTY larger than the maximum value MAXDT has been set, the duty ratio DUTY is immediately lowered to the maximum value MAXDT.

In the meantime, when it is determined that the duty ratio DUTY is less than the maximum value MAXDT at Step 10, it goes to Step 12, wherein the duty ratio DUTY is increased only by a predetermined value and renewed.

According to such control, in the non-deceleration driving zone in the lockup zone, the duty ratio DUTY of 95% is sent to the lockup solenoid 54 to control the lockup clutch 40 in the stable full lockup state (direct engagement state of the clutch), but when entering the deceleration driving zone, the direct engagement state is ensured but the duty ratio DUTY is set lower so that the lockup force of the lockup clutch 40 is weakened.

And acceleration from the decelerating driving state into the non-deceleration driving state does not mean an immediate shift to the 95% duty ratio DUTY corresponding to the non-deceleration driving zone, but for a predetermined time determined by the predetermined value compared with the timer TM, control is executed with the duty ratio DL so as to be lower than that of the deceleration driving state, and only after the predetermined time has passed, the above duty ratio DL is gradually increased to the 95% duty ratio DUTY (See FIG. 8 (a)).

That is, when accelerated from the deceleration driving zone (particularly the low car-speed side), the engine output torque rises so rapidly that the torque is transmitted to the driving wheels as it is through the directly engaged lockup clutch 40 and shock is generated, if the lockup clutch 40 is locked up with high lockup force at that time. Then, the lockup force of the lockup clutch 40 is weakened in advance while maintaining its direct engagement state in the deceleration driving state so that a rise in torque can be absorbed by this weakened lockup force during acceleration, and moreover, the lockup force is further weakened for a predetermined time at the beginning of the acceleration thereby improving the ability to absorb the above torque and favorably prevent the generation of shock.

Also, as the generation of shock during acceleration from the deceleration driving state can be favorably prevented as mentioned above, the lockup clutch 40 can be locked up in a wide zone of the deceleration driving state, whereby a rapid decrease in the engine rotation speed during deceleration can be restrained, deceleration fuel cut control executed separately is carried on for a long time and fuel consumption can be improved.

Even by setting 95% for the maximum value MAXDT immediately after the idle switch 23a is switched from On to Off, the shock can be absorbed by the low duty ratio (lockup force) that has been set until then, but if the lockup force is gradually increased immediately from the beginning of acceleration, the generation of shock may not be fully absorbed. Then, within a limited time after having entered the non-deceleration driving zone, the lockup force is fully weakened thereby giving priority to absorbing shock over improvement in transmission efficiency.

Even if the deceleration driving zone and the non-deceleration driving zone are controlled by the same duty ratio DUTY and the duty ratio DUTY is decreased only for a predetermined time at the beginning of the transition from the deceleration driving zone to the non-deceleration driving zone, control of the lockup force has some response delay and shock cannot be fully absorbed. Then, as in this preferred embodiment, by weakening the lockup force of the lockup clutch 40 in advance in the deceleration driving state and by further weakening the lockup force for a predetermined time after acceleration is detected, the shock can be favorably absorbed.

The flowchart in FIG. 6 shows the contents of the lockup control in a second preferred embodiment. In this second preferred embodiment, when the idle switch 23a is switched from On to Off, switching of the duty ratio DUTY to the 95% duty ratio for the Off time is forcedly delayed for a predetermined time.

That is, it is the same as in the first preferred embodiment that the duty ratio DUTY is controlled at 95% in the non-deceleration driving zone in the lockup zone (idle switch 23a is off) and it is controlled at the level smaller than 95%, the minimum level (=duty ratio DH) that can maintain the direct engagement state, in the deceleration driving zone (idle switch 23a is on), except that control is carried out as follows at switching of the idle switch 23a from Off to On.

When it is determined that the idle switch 23a was On the last time, at Step 25, which means switching from On to Off, and it goes to Step 26, wherein the timer TM for measuring time having passed since the above switching is reset at zero, it then goes to Step 24, wherein the maximum value MAXDT smaller than 95% when the idle switch 23a is on is set and the maximum value MAXDT for the ON time is continuously set.

And until it is determined at Step 27 that the timer TM exceeds the predetermined value, the maximum value MAXDT is continuously set at step 24, and 95% is set for the maximum value MAXDT after a predetermined time has passed since the idle switch 23a was switched from On to Off (See FIG. 8(b)).

The part from the above Step 25 or Step 27 to Step 24 corresponds to the lockup force increase restraining means in this preferred embodiment (See FIG. 1).

If the lockup force of the lockup clutch 40 is weakened in advance in the deceleration driving state (the state where the idle switch 23a is on) in this way, shock during a rise in torque can be buffered without a response delay during acceleration from such a deceleration driving state, and by leaving the lockup force low only for a predetermined time even after the idle switch 23a is switched to Off, driving torque can be smoothly increased and generation of shock during acceleration can be favorably prevented.

As the steps in the flowchart of FIG. 6, whose explanation was omitted, carry out the same processing as those in FIG. 5 showing the first preferred embodiment, the explanation is omitted.

Next, the contents of the lockup control in a third preferred embodiment shown in the flowchart of FIG. 7 will be hereinafter described.

In the flowchart in FIG. 7, the processing at Step 7 in the flowchart of the first preferred embodiment is changed to a slip lockup control. That is, only the control contents in the predetermined time after the idle switch 23a is switched from on to Off is different from that of the first preferred embodiment with the remaining processing being the same, and only the processing different from that of the first preferred embodiment will be described in detail.

In the third preferred embodiment, when acceleration with the idle switch 23a switched Off from the state where the lockup clutch 40 is locked up and controlled by the relatively low duty ratio DUTY with the idle switch 23a in the ON state is detected, the duty ratio DUTY is feedback controlled so that a difference in the rotation speed of the input and the output shafts of the torque converter 3 is made constant and the slip lockup control is carried out for actively controlling the lockup clutch 40 in the semi-lockup state (Step 47).

Here, the input shaft rotation speed of the torque converter 3 can be obtained as the engine rotation speed Ne detected by the crank angle sensor 24, and the output shaft rotation speed can be obtained by the vehicle speed VSP detected by the vehicle speed sensor 21 and the gear ratio. And the difference in the rotation speed of the input and the output shaft becomes zero in the direct engagement state of the lockup clutch 40, but the lockup force of the lockup clutch 40 is feedback controlled through the duty ratio DUTY so that the above difference in the rotation speed becomes constant and rapid rise in torque at the beginning of acceleration is buffered by a slip in the semi-engaged state so as to prevent generation of shock during the acceleration together with an action by the lockup force, which has been weakened in advance in the deceleration driving state (See FIG. 8 (c)).

The part of the above Step 47 corresponds to the lockup force increase restraining means in this preferred embodiment (See FIG. 1), and the above crank angle sensor 24 and the vehicle speed sensor 21 correspond to the rotation speed detecting means.

What is claimed is:

1. A control device for an automatic transmission for a vehicle comprising:

a torque converter placed between an output shaft of an engine and an input shaft of a gear type transmission;

a lockup clutch for mechanically and directly engaging the input shaft with the output shaft of said torque converter;

a deceleration detecting means for detecting a deceleration driving state of the engine;

a non-deceleration detecting means for detecting a non-deceleration state of the engine;

a control value switching means for switching and setting a lockup force control value of said lockup clutch so that a lockup force in the deceleration driving state detected by said deceleration driving detecting means is smaller than a lockup force in the non-deceleration driving state;

a lockup control means for controlling lockup of said lockup clutch based on said lockup force control value in a predetermined driving zone including at least a deceleration driving zone; and a lockup force increase restraining means for forcedly delaying a rise in a lockup force of the lockup clutch during transition from the deceleration driving state to the non-deceleration driving state.

2. A control device for an automatic transmission for a vehicle according to claim 1 wherein said lockup force increase restraining means sets said lockup force control value so that a lockup force of the lockup clutch becomes further smaller than the lockup force in the deceleration driving state for a predetermined time at the beginning of a transition from the deceleration driving state to the non-deceleration driving state, taking precedence over said control value switching means 3. A control device for an automatic transmission for a vehicle according to claim 1 wherein said lockup force increase restraining means forcedly delays the switching of the lockup force control value by said control value switching means during transition from the deceleration driving state to the non-deceleration driving state.

4. A control device for an automatic transmission for a vehicle according to claim 1 wherein said lockup force increase restraining means comprises a rotation speed detecting means for detecting rotation speed of each of the input and output shafts of said torque converter and feedback controls said lockup force control value so that a difference in the rotation speed of the input and the output shaft detected by said rotation speed detecting means becomes constant for a predetermined time at a beginning of a transition from the deceleration driving state to the non-deceleration driving state, taking precedence over said control value switching means.

5. A control device for an automatic transmission for a vehicle according to claim 4 wherein said rotation speed detecting means detects rotation speed of the input shaft of the torque converter as the rotation speed of the engine and detects the rotation speed of the output shaft of the torque converter based on a driving speed of the vehicle and a gear ratio of said gear type transmission.

6. A control device for an automatic transmission for a vehicle according to claim 1 wherein said lockup clutch is a hydraulic clutch having a lockup force which is regulated according to supply hydraulic pressure, and said lockup force control value is given as a duty ratio of opening/closing control of a valve for regulating said supply hydraulic pressure.

7. A control device for an automatic transmission for a vehicle according to claim 1 wherein said lockup force of the lockup clutch in the deceleration driving state detected by said deceleration detecting means is a minimum lockup force capable of maintaining a direct engagement state of the lockup clutch.

8. A control device for an automatic transmission for a vehicle according to claim 1 wherein said deceleration detecting means detects an idle position of a throttle valve provided in an intake system of the engine as the deceleration driving state.

9. A control device for an automatic transmission for a vehicle according to claim 1 wherein a predetermined driving zone where said lockup clutch is to be locked up is determined by an opening degree of a throttle valve provided in an intake system of the engine and a driving speed of the vehicle.

10. A control method for controlling an automatic transmission for a vehicle, wherein a lockup clutch is provided for mechanically and directly engaging an input shaft with an output shaft of a torque converter placed between an output shaft of an engine and an input shaft of a gear type transmission, comprising:
- a step for detecting a deceleration driving state and a non-deceleration driving state;
- a step for sensing a lockup force of the lockup clutch;
- a step for switching and controlling the lockup force of the lockup clutch so that the lockup force in the deceleration driving state of the engine is smaller than the lockup force in the non-deceleration driving state; and
- a step for forcedly delaying a rise in the lockup force of the lockup clutch during a transition from the deceleration driving state to the non-deceleration driving state.

11. A control method for an automatic transmission for a vehicle according to claim 10 wherein at the step for forcedly delaying a rise in said lockup force, said lockup force is forcedly controlled so that it is further smaller than the lockup force in the deceleration driving state for a predetermined time at a beginning of a transition from the deceleration driving state to the non-deceleration driving state.

12. A control method for an automatic transmission for a vehicle according to claim 10 wherein at the step for forcedly delaying a rise in said lockup force, a transition from the lockup force corresponding to the deceleration driving state to the lockup force corresponding to the non-deceleration driving state is forcedly delayed for a predetermined time during transition from the deceleration driving state to the non-deceleration driving state.

13. A control method for an automatic transmission for a vehicle according to claim 10 further comprising a step for sensing a rotation speed of the input and output shafts and wherein at the step for forcedly delaying a rise in said lockup force, the lockup force is forcedly feedback controlled so that a difference between the rotation speed of the input and the output shafts of the torque converter becomes constant for a predetermined time at a beginning of a transition from the deceleration driving state to the non-deceleration driving state.

14. A control method for an automatic transmission for a vehicle according to claim 13, further comprising sensing a driving speed of the vehicle and sensing a gear ratio of the gear type transmission and wherein the rotation speed of the input shaft of the torque converter is detected as a rotation speed of the engine and the rotation speed of the output shaft of the torque converter is detected based on the driving speed of the vehicle and the gear ratio of the gear type transmission.

15. A control method for an automatic transmission for a vehicle according to claim 10 wherein the lockup clutch is a hydraulic clutch having a lockup force which is regulated by supply hydraulic pressure and the lockup force of the hydraulic clutch is controlled according to a duty ratio of opening/closing control of a valve for regulating the supply hydraulic pressure.

16. A control method for an automatic transmission for a vehicle according to claim 10 wherein a lockup force of a lockup clutch during deceleration driving is a minimum lockup force capable of maintaining a direct engagement state of the lockup clutch.

17. A control method for an automatic transmission for a vehicle according to claim 10 wherein an idle position of a throttle valve provided in an intake system of an engine is detected as the deceleration driving state of the engine.

18. A control method for an automatic transmission for a vehicle according to claim 10 wherein a driving zone where said lockup clutch is to be locked up is determined by an opening degree of a throttle valve provided in an intake system of an engine and a driving speed of the vehicle.

* * * * *